United States Patent
Kunz et al.

Patent Number: 5,346,623
Date of Patent: Sep. 13, 1994

[54] COUNTER-CURRENT PROCESS FOR THE RAPID REGENERATION OF ION EXCHANGE MATERIALS IN AN UNRESTRAINED BED

[75] Inventors: Gerhard K. Kunz, Heiligenhaus, Fed. Rep. of Germany; George L. Dimotsis, Landsdale, Pa.; Richard L. Sampson, Trumbull, Conn.

[73] Assignee: EDR Acquisition Corp., Plantsville, Conn.

[21] Appl. No.: 853,045

[22] Filed: Mar. 18, 1992

[51] Int. Cl.$^5$ .................................. C02F 1/42
[52] U.S. Cl. .................................. 210/678; 521/26
[58] Field of Search .............. 210/678, 687; 521/26

[56] References Cited

U.S. PATENT DOCUMENTS

| | | | |
|---|---|---|---|
| 3,021,276 | 2/1962 | Mast | 210/35 |
| 4,181,605 | 1/1980 | Braswell | 210/19 |
| 4,184,893 | 1/1980 | Halvorsen et al. | 134/25 R |
| 4,202,737 | 5/1980 | Shimizu | 210/32 |
| 4,379,057 | 4/1983 | Meiser et al. | 210/662 |
| 4,385,992 | 5/1983 | Clauer et al. | 210/662 |
| 5,108,616 | 4/1992 | Kunz | 210/678 |
| 5,114,595 | 5/1992 | Hensley | 210/792 |

FOREIGN PATENT DOCUMENTS

| | | |
|---|---|---|
| 0165831 | 12/1985 | European Pat. Off. |
| 1442389 | 10/1968 | Fed. Rep. of Germany |
| 3528800 | 4/1987 | Fed. Rep. of Germany |
| 1352176 | 5/1964 | France |
| 61-12490 | 4/1986 | Japan |
| 894669 | 1/1990 | South Africa |
| 1539161 | 1/1979 | United Kingdom |

OTHER PUBLICATIONS

English translation of French Pat. No. 1,352,176.
English translation of German Pat. No. DE 3528800 A1.

*Primary Examiner*—Ivars Cintins
*Attorney, Agent, or Firm*—Cumpston & Shaw

[57] ABSTRACT

A method of regenerating an ion exchanger which is used to treat a solution introduced to the ion exchanger in a downward changing direction. The ion exchanger contains a non-constrained bed of ion exchange material in the form of ion exchange granules and has a concentration profile through the ion exchange material after solution has been introduced to the ion exchanger in the charging direction. The method of regenerating comprises passing a regenerating solution upwardly through the non-constrained bed of ion exchange material in an intermittent flow manner comprising an alternating up flow of regenerating solution followed by a down flow of liquid in a direction opposite to the up flow. The duration and velocity of the up flow of regenerating solution is sufficient to lift and generate a perceptible mixing of ion exchange materials in approximately the bottom portion of the ion exchange bed, with the down flow being sufficient to seat the bed very rapidly and terminate mixing.

12 Claims, 4 Drawing Sheets 5,346,623

COUNTER-CURRENT PROCESS FOR THE RAPID REGENERATION OF ION EXCHANGE MATERIALS IN AN UNRESTRAINED BED

FIELD OF INVENTION

The present invention relates to an improved process for regenerating ion exchange materials, and more specifically, for the regeneration of an ion exchanger following processes such as water softening or deionization, wherein a chemical solution is passed through the ion exchanger for regeneration and the exchanger is rinsed free of regenerating chemical, after which the exchanger is returned to service for further softening or other ion exchange.

BACKGROUND OF THE INVENTION

Ion exchange processes such as softening or demineralization are generally known, where fixed charged sites present on ion exchange materials, such as bead like ion exchange resins, provide sites to bind or store oppositely charged ions and/or particles. These ions and or particles may be exchanged for others existing in solution in a reversible equilibrium process which modifies the ionic composition of the liquid flowing through said ion exchange materials. After the exchange process is completed the process can be reversed by passing a concentrated solution of the original stored ions through the ion exchange medium, eluting the ions or particles exchanged from the solution during exhaustion by replacing them with the original stored ions, and rinsing both the eluted ions and any residual regenerating solution from the ion exchange medium. Once rinsed, the ion exchanger can be placed back into service, again releasing the stored ions in exchange for other ions or charged particles in solution. The exhaustion flow is typically downward, through the ion exchanger, from the top of the ion exchanger and out through the bottom.

To conduct regeneration following exhaustion in the downward direction: it is known to introduce the regenerating solution in the same direction as the exhausting flow, from top to bottom, i.e., in a co-current direction, through the ion exchanger. The regeneration of the ion exchange bed in a co-current direction has considerable drawbacks, as illustrated by the example of the softening of hard water. In this case, hard water flows through layers of ion exchanger material (such as ion exchange resins or zeolite) contained in a vessel (ion exchanger), and the ion exchanger becomes exhausted, or loaded in the flow direction, i.e., from top to bottom, with hardness (principally calcium and magnesium ions). The ion exchange process is equilibrium driven and the final reduction of hardness in the processed water is dependent upon the concentration of hardness ions in the lowermost ion exchange layer (polishing layer), which is the last one through which the water to be treated flows. The lower the residual hardness in the product water, the better the product water quality. During the subsequent regeneration in a co-current system, the hardness ions which are highly enriched in the upper layers of the ion exchanger are eluted from the resin by the regenerating solution and washed downward into the lower layers. In order to generate a good state of regeneration in these lower layers, an excess of regenerating chemical must be employed. This excess is frequently as much as 2 to 3 times the stoichiometric amount required to regenerate the resin depending on the level of hardness required in the product water. This excess amount of regenerating chemical is not utilized and represents a major economic loss both in terms of the cost of the excess regenerating chemical as well as the cost associated with its subsequent disposal.

Introduction of the regenerating solution in an upward direction, opposite to that of the exhausting flow, i.e., in a countercurrent direction, through the ion exchanger is also known. The disadvantage of this process is that the entire bed of ion exchange material, unless fixed or restrained in place by some mechanism, is turned over and mixed together. In particular, the upper layers of ion exchange resins which are most highly charged with hardness are also more dense and are forced from the upper layers to the lower layers as mixing occurs, while the less dense ion exchange material that is still largely uncharged is forced upward from the lower layers to the upper layers. Thus, because of this rearrangement, the situation is similar to the cocurrent operation in that the entire ion exchange bed must be treated with a large excess of regenerating chemical in order to achieve good product quality. The drawbacks in using large excesses of regenerating chemical are the same.

The most efficient use of regenerant and, at the same time, the best product quality is obtained when the ion exchange materials are not mixed or rearranged during counter current regeneration. As a result, the lower most layers of ion exchange materials (or polishing layers) which determine the quality of the product during the charging operation are treated first with fresh regenerating solution and are thus optimally regenerated. Several known systems control this mixing or rearrangement by fixing the bed through the use of either physical restraints or a combination of physical restraints and blocking liquid and or air flows. In each of these methods, the underlying commonality is the need to physically fix or otherwise restrain the ion exchange bed during the regeneration process in order to solve the known difficulties which arise from bed mixing during counter-current regeneration. Each of these known processes has its own known drawbacks and operational problems due to their bed fixing mechanisms.

Another method allows an efficient, counter current regeneration of a non-constrained (not fixed) layered bed without many of the aforementioned problems and is described in allowed U.S. patent application Ser. No. 07/369,238 to Gerhard K. Kurtz filed Jun. 22, 1989 entitled PROCESS AND APPARATUS FOR ION EXCHANGERS, PARTICULARLY FOR REGENERATION AFTER SOFTENING AND DEMINERALIZATION OF AQUEOUS SOLUTIONS, which is incorporated herein by reference. A Kunz counterpart application has issued in the Republic of South Africa as Patent 89/4669 and is also incorporated herein by reference. In this process, as described by Kunz, an ion exchange filter which has been exhausted in a downflow direction is first treated with a regenerating chemical solution and then with a rinse solution, introducing both in a counter current direction, i.e., upflow. This is accomplished by using a series of upward flowing pulses of defined velocity and duration which lift the bed some prescribed distance and are separated by a settle or rest time during which the ion exchange bed returns to substantially its original position without mixing. The essential focus of the Kurtz process is its successful approach to introducing the regenerant chemical without causing significant mixing between the layers of a non-constrained ion exchange bed. This process leads to very efficient utilization of regenerating chemical, and provides the high quality product characteristic of a countercurrent process, since the bed concentration profile is maintained and the lower or polishing layers of the ion exchange bed are always treated with fresh regeneration solution. However, while eliminating the need for various complicated and expensive mechanical apparatus utilized to fix or restrain the ion exchange bed, this regeneration process takes significantly longer than typical operations, thereby limiting its commercial viability.

Accordingly, it is the object of the present invention to overcome the long regeneration time associated with the Kurtz process while maintaining the inherent efficiencies of this process and without re-introducing any of the mechanical design difficulties associated with other previous fixed bed processes.

Specifically, it is the object of the present invention to achieve the rapid, efficient countercurrent regeneration of an unconstrained ion exchange bed in an upward direction with substantially the same amount of regenerating chemical as the Kunz process thereby obtaining a significant savings in both regenerating chemical cost and subsequent associated waste disposal costs without requiring an extended regeneration time.

SUMMARY OF THE INVENTION

The present invention is directed to an improved ion exchange regeneration process which allows a rapid, efficient counter-current regeneration of a non-constrained ion exchange bed in an upward direction. Layered ion exchange material in a vessel exhausted by downward flow is first treated with a regenerating chemical and then with a rinse solution by feeding these solutions in an upward direction through the ion exchange materials, a direction opposite to, or countercurrent to, the exhausting flow direction. The flow of both regenerating and rinsing solutions are conducted in such a manner that mixing or rearrangement between the layers of the exchange material is limited to the lower portion or polishing layer of the ion exchange bed. The bed lifting and perceptible mixing at the bottom of the bed according to this invention allows the highest possible flow of regenerating and rinse solutions to be introduced into the bed while restricting mixing to the polishing layers of the bed where the effect of such mixing on overall performance is minor. This permits rapid and efficient regeneration.

Mixing of polishing layers of the exchange materials in a non-constrained bed is controlled in accordance with the present invention by a process in which the regenerant chemical and rinse solutions are introduced into the exchanger in an upward direction, opposite the exhaustion direction, at a velocity and time sufficient to lift the bed and cause perceptible mixing within the lower layers of the ion exchange bed, followed by a downward flow sufficient to re-settle the bed very rapidly thus terminating the preceding perceptible mixing. During the up flow, a flow of regenerant chemical or rinse solution passes through the bed. As the up flow is allowed to proceed, the bed lifts and perceptible mixing begins to occur at the bottom of the ion exchanger. When the perceptible mixing has reached a predetermined level, a downward flow of liquid, of volume less than the up flow volume, is introduced above the ion exchange bed. This down flow seats the bed very rapidly and ends bed mixing. Regenerant expelled from the bottom of the bed by this downflow is re-introduced along with fresh regenerant in the next up flow mixing interval. This sequence is continued until the required quantity of regenerating chemical has been passed through the bed. The same process is carried out with a rinse solution until the ion exchanger has been rinsed sufficiently free of regeneration chemical and displaced ions. The ion exchanger can then be placed back in service.

A variety of up and downward flow velocities and times can be successfully used in this process. However, the most rapid regeneration occurs with the largest net volume difference between the up and down flows in the shortest cycle time between the up flow and down flow periods. This relationship can be experimentally determined for a variety of ion exchange materials and regenerating chemicals. As an example, in the case of a water softening operation within a nominal 1 inch I.D. column containing 1 meter of cation resin sold by Rohm and Haas under the tradename IR 120 being regenerated with a 4% NaCl brine solution, the fastest regeneration times are typically obtained with up flow velocities of 0.5 to 1 cm/sec with bed lifting times from 4 to 20 seconds. Down flow velocities are typically 3 to 10 cm/sec at times from 0.4 to 1.5 seconds.

Practice of the current invention by (a) feeding the regenerating chemical and rinse streams into the exhausted ion exchanger in an upward direction opposite to that of the exhausting flow direction portion of the ion, (b) passing this stream through the ion exchanger in the form of up and down flows consisting of alternate up flow regenerant chemical or rinse liquid introduction and down flow bed re-settling, (c) designing of the up flow and down flow intervals and velocities so that the lifting of the bed and the degree of perceptible mixing is hydrodynamically controlled provides significant advantages over prior art.

The present invention allows operation of a counter current ion exchange unit in a non-fixed unconstrained bed where the time required for regeneration is similar to that found in other known systems, including typical co-current operations, while maintaining efficient regeneration chemical utilization. Other systems which are known to operate at regeneration times similar to the present invention must employ regenerant chemical flow rates which, without some mechanism of bed restraint, lead to mixing of the ion exchange bed and therefore poor regeneration chemical utilization. Regeneration according to Kunz provides the efficient regeneration chemical utilization typical of counter current operation and avoids the problems associated with known restraint mechanisms but at the cost of intermittent flows with long pauses, or settle times which lead to long regeneration times. Control of the un-constrained bed according to the present invention permits rapid introduction of regenerating chemical and rinse solutions while localizing the small degree of mixing of the ion exchange bed to the polishing layers; thus, the present invention achieves the best features of the prior art and provides excellent regeneration chemical utilization and short regeneration time through the selection of appropriate combinations of controlled bed lifting and perceptible mixing level and net regenerant or rinse flows through the bed.

In the present invention, only the lower or polishing layers of the column are allowed to mix so that no significant physical exchange of material between the highly exhausted layers at the top of the ion exchange bed and the less exhausted layers at the bottom is allowed to occur. The ion exchange materials in the upper 65% to 95% of the bed height remain substantially in the same relative layers during the regeneration process. As a result the concentration profile produced in the ion exchanger during the prior charging or exhaustion cycle remains essentially intact. As is known in the art, this leads to optimum utilization of regenerating chemical.

The present invention maintains many of the advantages taught by Kurtz. In addition, like Kurtz, the ability of the present invention to operate with an unconstrained or non-fixed bed obviates the need for mechanical installations for restraining the beds such as nozzle plate systems, drainage systems, and the like previously required for such countercurrent processes. Thus, like systems using the Kurtz process, ion exchange systems manufactured in accordance with the present invention can be produced at a lower overall cost than other previously known systems.

DETAILED DESCRIPTION OF THE DRAWINGS

Figure 1:
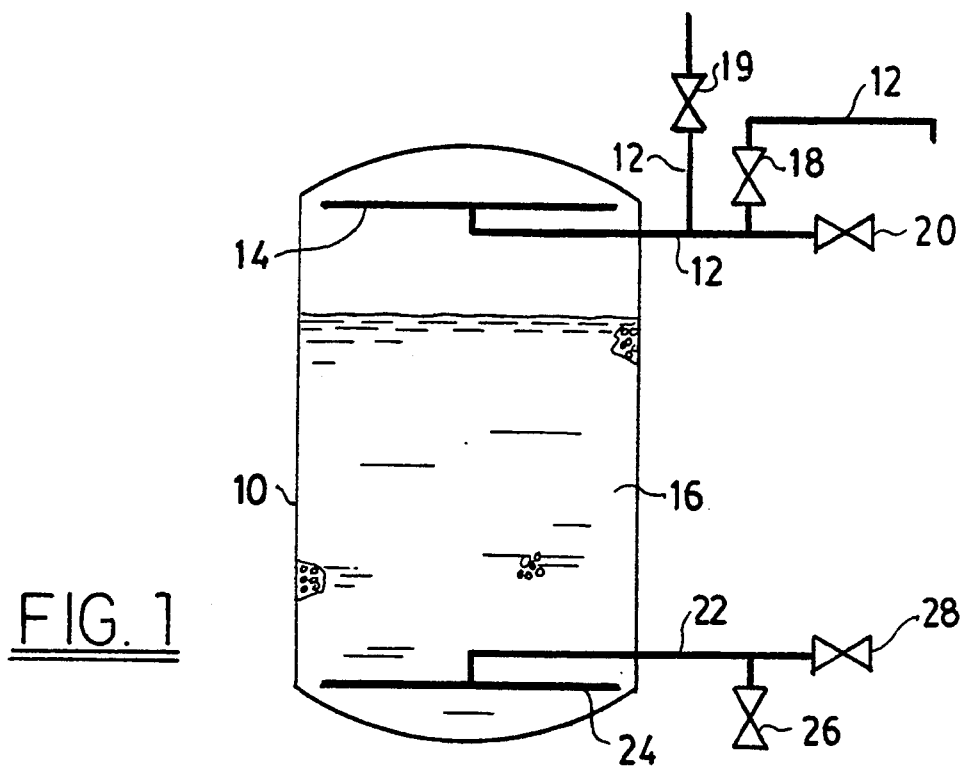
FIG. 1 is a schematic illustration of an ion exchange vessel suitable for use in carrying out the process of the present invention.

FIG. 1 illustrates an ion exchange vessel 10 with hardware suitable for carrying out the present invention. The vessel contains an upper distribution system which consists of piping 12 having a distributor 14 which contains a plurality of openings or ports (not shown) for providing a flow of fluid to a resin bed 16. The distributor 14 is operably connected via piping 12 to valves 18, 19 and 20 at the top of vessel 10. Vessel 10 further contains a lower distribution system which consists of piping 22 and a distributor 24 equivalent to that of the upper distribution system, with piping 22 being operably connected to valves 26 and 25, respectively. An unconstrained ion exchange resin bed 16 is contained within vessel 10.

In operation, vessel 10 operates as follows for a typical water softening process.

During the exhaustion cycle, water containing hardness passes through valve 20 into the vessel 10 through piping 12, through distributor 14, through the resin bed 16, down through the lower distributor 24 and out the vessel through piping 22 and through valve 28. When exhaustion is complete, valves 20 and 28 are closed. A flow of regenerating brine is introduced through valve 26, through the distributor 24, upwardly through the bed 16, through distributor 14, and out through piping 12 and valve 18 at velocities which cause bed lifting and perceptible mixing within the bed. The up flow of regenerant is continued until bed lifting and perceptible mixing has preceded some predetermined distance up the bed. At that point, a flow of water in the opposite or downward direction is introduced into vessel 10, through valve 19, through piping 12, through distributor 14, down through the resin bed 16 and out of the vessel 10 through distributor 24, piping 22 and valve 26. This downward flow forces the bed to settle to essentially its original position prior to the start of the next up flow of regenerant. The chemical displaced from the bottom of vessel 10 during the down flow step is then re-introduced along with fresh regenerant chemical in the next up flow cycle. This above sequence is repeated until enough regeneration chemical has passed through the bed. The process is then continued with rinse water being used instead of regenerant chemical until enough regenerating chemical has been displaced from the bed.

The flow of water or other solution through the device of FIG. 1 is controlled and monitored by any conventional means available in the art. In the case of FIG. 1, a conventional centrifugal pump (not shown) was used, but any other means may be employed, such as for example, line pressure. Similarly, the timing and sequencing for the up flow and down flow may be monitored by a conventional programmable logic controller (PLC) which is not shown.

Although the down flow has been described as being generated using certain apparatus described above, it should be understood that any technique or process available to the art may be used. For example, in an alternative embodiment, as the initial up flow pulse exits the vessel, it enters and pressurizes a container called an accumulator which in turn produces the pressure and flow which may be used to generate the subsequent down flow or counterpulse. It should also be understood that down flows through only a portion of the bed would also be effective in creating the bed settling requirements of the present invention.

Figure 2A:
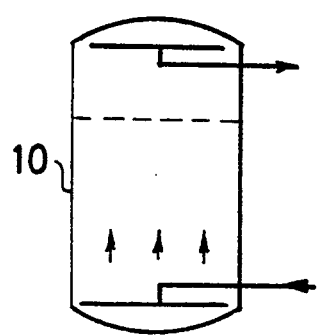
FIGS. 2A and 2B illustrate the present invention in the form of a flow diagrams.
Figure 2B:
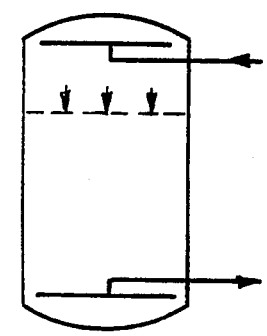

FIG. 2A shows the up flow period when regenerant chemical or rinse water is introduced into the bed and FIG. 2B shows the down flow period used to resettle the bed after the bed lifting and perceptible mixing created during the up flow period. The arrow and arrow heads indicate the flow path in each figure.

In carrying out the process of the present invention it should be understood that any conventional apparatus, hardware and/or control mechanisms which are available in the art may be used. For example, suitable plumbing, discharge devices, distributors, collectors, and related valves and control mechanisms which may be used to run and monitor the process of this invention, are taught by the allowed Kunz U.S. application and Kunz counterpart South African patent, U.S. Pat. Nos. 4,181,605, 4,184,893 and 4,202,737, German Patent 1,352,176 to Degremont; and German Patent Publication DE 35 28 800 A1 published Feb. 12, 1987 to Eumann, all of which are exemplary of the prior art, and all of which are incorporated herein by reference.

For the data presented herein, regeneration performance was described by the percent of stoichiometric utilization of regenerating chemical which is defined in the case of softening as:

$$\frac{\text{eq. NaCl used}}{\text{eq. Hardness removed}} \times 100 = \text{\% of stoichiometric regeneration chemical utilization}$$

In other cases, the general definition is:

$$\frac{\text{eq. Regenerating agent}}{\text{eq. Ions exchanged}} \times 100 = \text{\% of stoichiometric regeneration chemical utilization}$$

These equations describe regeneration chemical utilization as the ratio of chemical equivalents of regenerating chemical introduced into the ion exchanger during regeneration to the chemical equivalents of all ions displaced from the ion exchanger materials during regeneration. Therefore, as the percent of stoichiometric regeneration chemical utilization increases, the greater the excess chemical used in the regeneration process, with the stoichiometric (theoretical minimum) amount of regenerant chemical being used when the percent of stoichiometric regeneration chemical utilization equals 100%.

During the regeneration and slow rinse process, the spent regenerating chemical and rinse solutions were accumulated and analyzed to determine the amount of regenerating chemical introduced and the amount of hardness ions displaced. For example, the spent regenerating solution would be tested to determine the amount of NaCl used and the amount of hardness (Mg and Ca ions) removed during the regeneration process.

Figure 3:
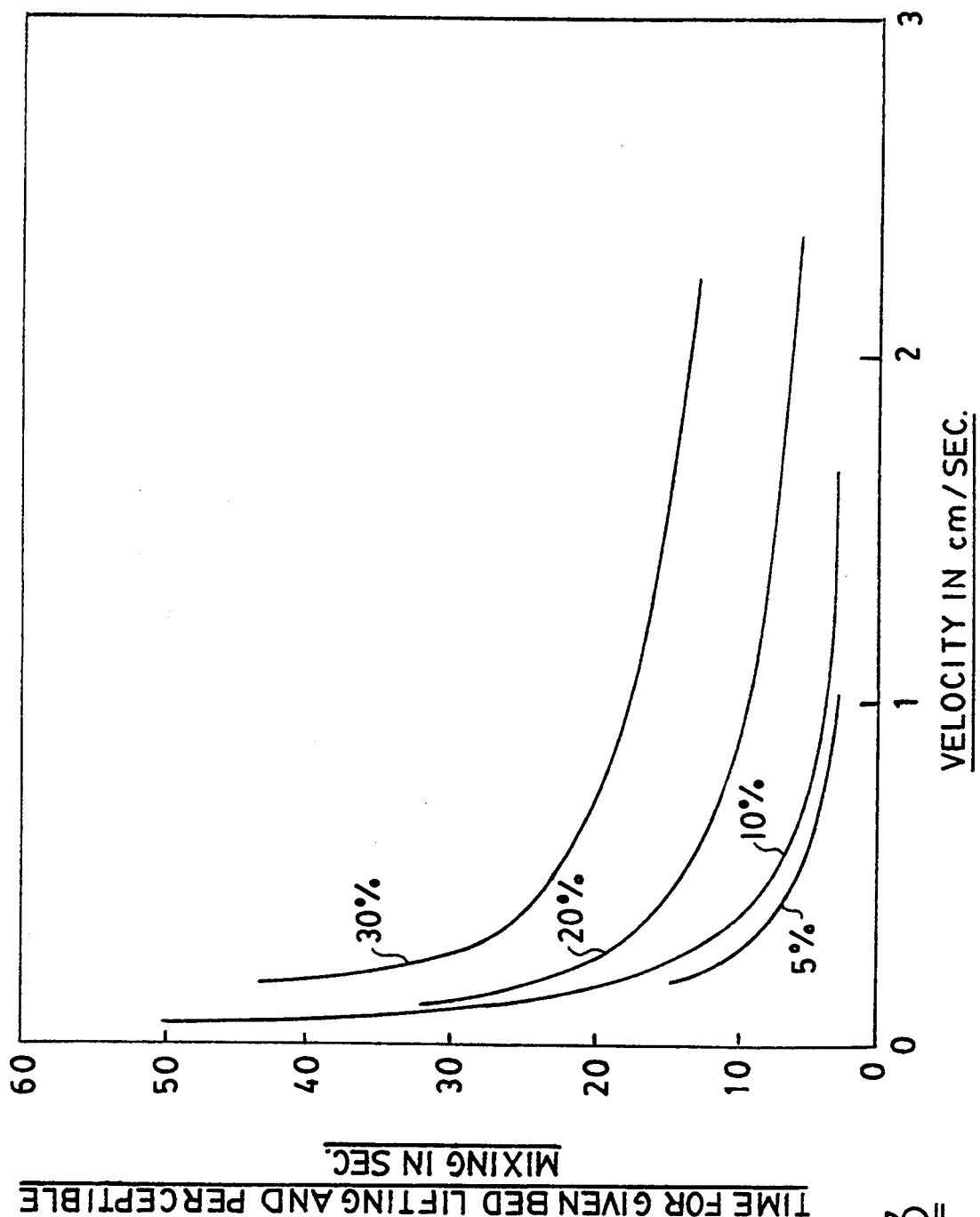
FIG. 3 is a series of curves illustrating the relationship of up flow velocity and time to produce a given bed lifting and perceptible mixing height in an ion exchange bed as a percent of total bed height.
Figure 4:
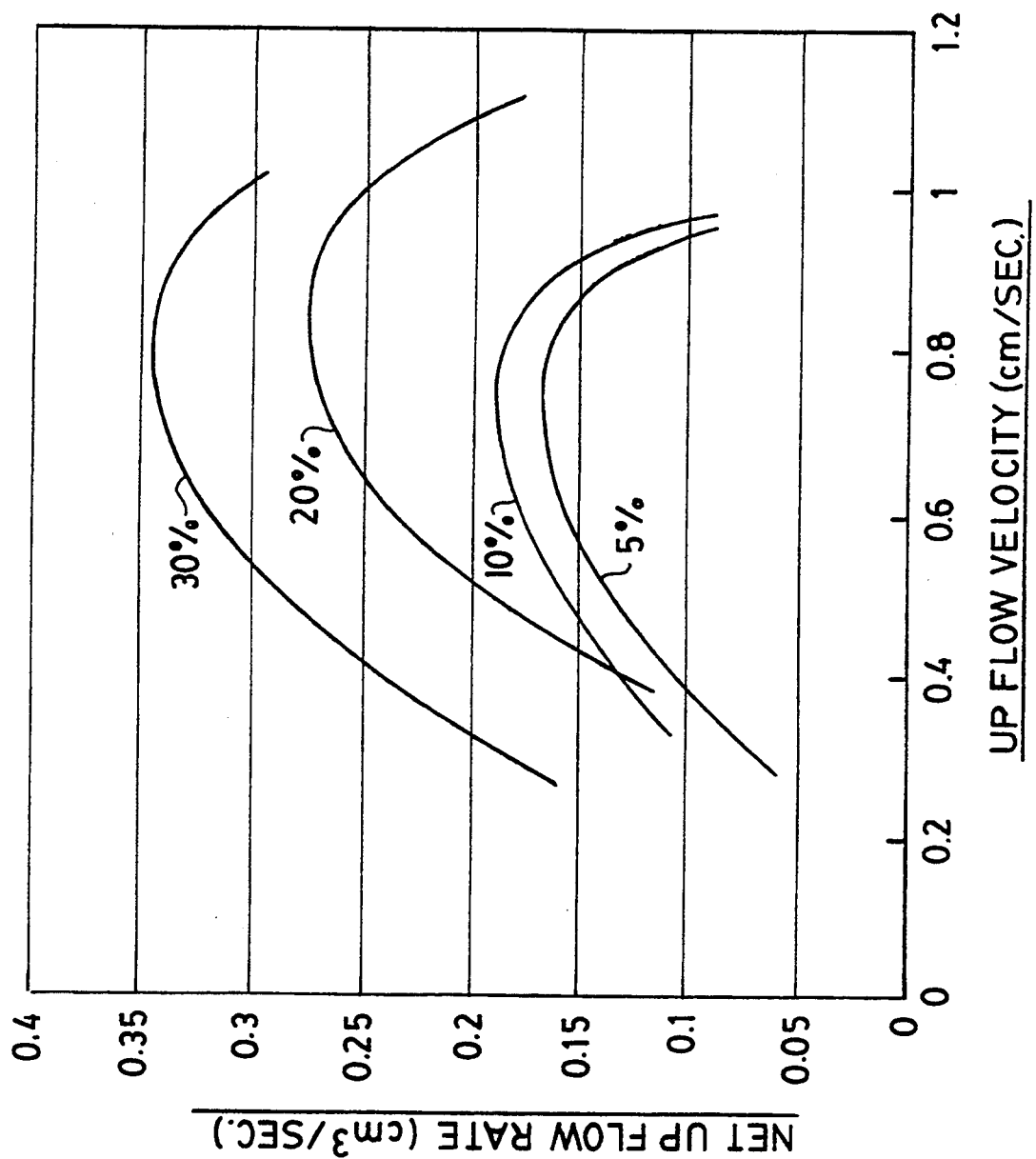
FIG. 4 is a series of curves illustrating the relationship of up flow velocity and average net regenerant chemical flow rate at different bed lifting and perceptible mixing heights as a percent of total bed height.
Figure 5:
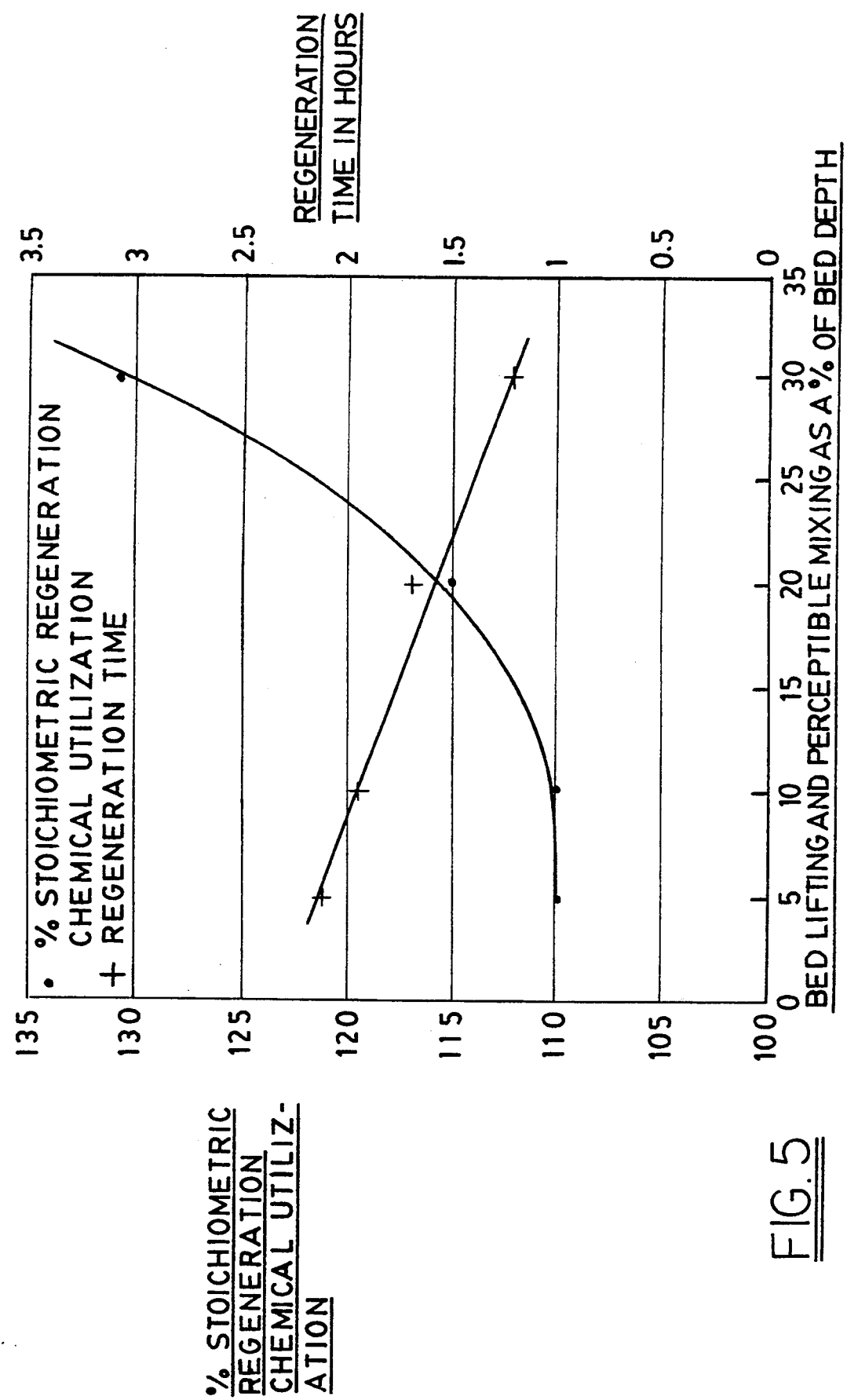
FIG. 5 is a curve illustrating a plot of regeneration chemical utilization and regeneration time at various bed lifting and perceptible mixing heights as a percent of total bed height.

For a given ion exchange bed, the rate at which regeneration will proceed with the present invention is at an optimum when the difference between the up flow and the down flow volumes is at a maximum while the time for the cycle between the up flow and down flow periods is at a minimum. Also for a given ion exchange bed the percent of stoichiometric regeneration chemical utilization is a function of the degree of bed lifting and perceptible mixing allowed during the up flow portion of the process. The relationships for both regeneration rate and percent of stoichiometric regeneration chemical utilization have been determined for a vessel, as illustrated in FIG. 1, employing a nominal one inch column containing one meter of Rohm and Haas IR 120 cation resin and are presented in the following graphical manner:

The data presented in the FIGS. 3, 4 and 5 was obtained using a cation exchange resin available from Rohm and Haas under the tradename IR 120. It should be understood that any suitable cation or anion exchange resin may be used with the present invention. For example; specific reductions to practice were also made with IRA 402, a Rohm and Haas anion resin.

FIG. 3 comprises a series of curves which illustrate the relationship of time and velocity required to lift the bed and cause a given bed lifting and perceptible mixing height as a percent of total bed height. Each curve represents the relationship between the time and velocity required to obtain a specified level of bed lifting and perceptible mixing as a percent of total bed height. This data was obtained in the following manner. An up flow of 4% NaCl was introduced through valve 26 upwardly through the bed 16 and out through valve 18 at a given velocity between 0.2 cm/sec and 2.0 cm/sec. This flow was maintained for a period required to lift and perceptibly mix the bottom of the bed to a pre-determined height (5 cm, 10 cm, 20 cm, 30 cm) from the bottom of the bed and the time required for this degree of bed lifting and perceptible mixing was recorded. Mixing to the height of 5 cm, 10 cm, 20 cm and 30 cm represented 5%, 10%; 20% and 30% of bed lifting and perceptible mixing of the one meter (100 cm) bed, respectively. Once the up flow produced the given amount of bed lifting and perceptible mixing within the bed, a flow of water was introduced to vessel 10 in the opposite or downward direction, through valve 19, through the bed 16, and out through valve 26. This downward flow forced the bed to settle to its original position. This series of events was repeated for several different velocities in the range of 0.1 cm/sec to 2.0 cm/sec to generate the series of curves depicting the relationship of time and velocity required to get a given degree of bed lifting and perceptible mixing within the vessel.

FIG. 4 comprises a series of curves which illustrate the net flow through the bed at various up flow velocities for given bed lifting and perceptible mixing heights as a percent of total bed height. The data for these curves were generated using the vessel described above and were obtained in the following manner. An up flow of 4% NaCl was introduced through valve 26 upwardly through the bed 16 and out through valve 18 at a given velocity between 0.2 cm/sec and 1.2 cm/sec. This flow was maintained for a period of time required to lift and mix the bottom of the bed to some predetermined height (5 cm, 10 cm, 20 cm, 30 cm, representing respectively 5%, 10% 20% and 30% of bed lifting and perceptible mixing of the one meter bed) from the bottom of the bed, as shown in FIG. 3, and the bed was then re-seated with a flow of water in the opposite or downward direction through valve 19 and out valve 26. This downward flow was just large enough to return the bed to its original position, before the introduction of the next up flow. The volume of the up and down flows were measured by collecting them and the difference in their volume was determined. The average net up flow rate through the column at each flow velocity during this process was calculated as follows:

Net up flow rate =

(up flow volume − down flow volume)/cycle time, where the up flow volume was the measured volume ($cm^3$) of the up flow, the down flow was the measured volume ($cm^3$) of the down flow as described above; the cycle time was the up flow time in seconds plus the down flow time in seconds; and the net up flow rate was in $cm^3$/sec.

FIG. 5 illustrates two curves which present a plot of percent of stoichiometric regeneration chemical utilization and regeneration time at given bed lifting and perceptible mixing heights as a percent of total bed height for one embodiment of the process. The data was generated using a one inch nominal I.D. column, equipped as described in FIG. 1, filled to a depth of one meter with IR 120 cation exchange resin from Rohm and Haas. The regenerations were done with three pounds of NaCl at a concentration of 4% by weight. The up flow velocity was held to 0.8 cm/sec with down flow velocities of typically 4 to 6 cm/sec. which gave maximum throughput (minimum regeneration times), and a series of regenerations were conducted as described for FIG. 1 with the degree of bed lifting and perceptible mixing as a percent of total bed height being 5%, 10%, 20%, and 30%. In each case the time required to complete the regeneration as well as the percent of stoichiometric regeneration chemical utilization was recorded.

As shown by the data in FIG. 5, increasing the degree of bed lifting and perceptible mixing reduced the total regeneration time but caused a negative effect on regeneration chemical utilization (higher percent of stoichiometric regeneration chemical utilization). Bed lifting and perceptible mixing at a range significantly higher than taught by Kunz but limited to the first portion of the bed (10-20%) substantially reduced regeneration time with only a modest effect on regeneration chemical utilization.

Table 1 further illustrates the difference in regeneration time and the percent of stoichiometric regeneration chemical utilization between a regeneration according to Kurtz and the present invention. This data was based on a bed lifting and perceptible mixing height equal to 15% of the total bed height for the present invention. Data for both cases describe the NaCl regeneration of a one meter cation exchange bed in a nominal one inch column. Although some small loss in regeneration chemical utilization versus Kunz at optimum regeneration chemical utilization is experienced with the present invention, a significant reduction in regeneration time is observed. The regeneration time for the Kunz process can be shortened by decreasing the settle time. However, as the Kunz regeneration time starts to approach that achieved by the present invention, regeneration chemical utilization decays rapidly, and becomes significantly poorer than those achievable by the present invention.

TABLE 1

| METHOD | TIME REQUIRED | % OF STOICHIOMETRIC REGENERATION CHEMICAL UTILIZATION |
| --- | --- | --- |
| Kunz at 20 sec. settle time and no mixing | 3.64 Hours | 108% |
| Kunz at 15 sec. settle time and no mixing | 2.8 Hours | 108% |
| Kunz at 11 sec. settle time and no mixing | 2.22 Hours | 150% |
| CURRENT INVENTION at 15% bed lifting and perceptible mixing | 1.8 Hours | 112% |

While the invention has been described in detail with respect to specific embodiments thereof, it will be understood by those skilled in the art that variations and modifications may be made without departing from the essential features thereof.

We claim:

1. A method of regenerating an ion exchanger which comprises:
    (a) providing an ion exchanger having a non-constrained bed of ion exchange material in the form of ion exchange granules;
    (b) passing a solution to be treated in a downward charging direction through said bed of ion exchange material resulting in the formation of a concentration profile of ions that have been exchanged from the top to the bottom of said bed through said ion exchange material with said profile exhibiting a higher concentration of ions at the top of said bed;
    (c) followed by passing a regenerating solution upwardly through the non-constrained bed of ion exchange material in a controlled intermittent pulsed flow manner comprising an alternating up flow of regenerating solution followed by a down flow of liquid in a direction opposite the up flow, the direction and velocity of said up flow of regenerating solution being sufficient to lift and generate a perceptible mixing of ion exchange materials in approximately the bottom 10% to 30% portion of said ion exchange bed, with said down flow being sufficient to seat the bed in less time than normal gravitational settle time and terminate mixing.

2. The method of claim 1 in which the solution being treated in paragraph (b) is an aqueous solution.

3. The method of claim 1 in which following the treatment with the regenerating solution, all of the steps of paragraph (c) are repeated using a rinse solution.

4. The method of claim 1 wherein paragraph (b) the solution being treated is an aqueous solution which is being softened or demineralized.

5. The method of claim 1 wherein paragraph (b) the ion exchanger material exchanges cation or anions from the solution.

6. The method of claim 1 in which the velocity sufficient to lift the bed and cause the upward flow is in the range of about 0.2 to 2.0 cm/sec.

7. The method of claim 1 in which the velocity of upward flow is about 0.8 cm/sec.

8. The method of regenerating an ion exchanger which comprises:
    (a) providing an ion exchanger having a non-constrained bed of ion exchange material in the form of ion exchange granules;
    (b) passing a solution to be treated in a downward charging direction through said bed of ion exchange material resulting in the formation of a concentration profile of ions that have been exchanged from the top to the bottom of said bed through said ion exchange material with said profile exhibiting a higher concentration of ions at the top of said bed;
    (c) followed by passing a regenerating solution upwardly through the non-constrained bed of ion exchange material in a controlled intermittent pulsed flow manner comprising an alternating up flow of regenerating solution followed by a down flow of liquid in a direction opposite the up flow, the duration and velocity of said up flow of regenerating solution being in the range of about 0.1 to 2.0 cm/sec. and sufficient to lift and generate a perceptible mixing of ion exchange materials in approximately the bottom 10% to 30% portion of said ion exchange bed, with said down flow being sufficient to seat the bed in less time than normal gravitational settle time and terminate mixing.

9. The method of claim 8 in which the solution being treated in paragraph (b) is an aqueous solution.

10. The method of claim 8 in which following the treatment with the regenerating solution, all of the steps of paragraph (c) are repeated using a rinse solution.

11. The method of claim 8 wherein paragraph (b) the solution being treated is an aqueous solution which is being softened or demineralized.

12. The method of claim 8 wherein paragraph (b) the ion exchanger material exchanges cations or anions from the solution.

* * * * *